No. 855,698. PATENTED JUNE 4, 1907.
G. W. DARLING.
NUT LOCK.
APPLICATION FILED JULY 13, 1906.
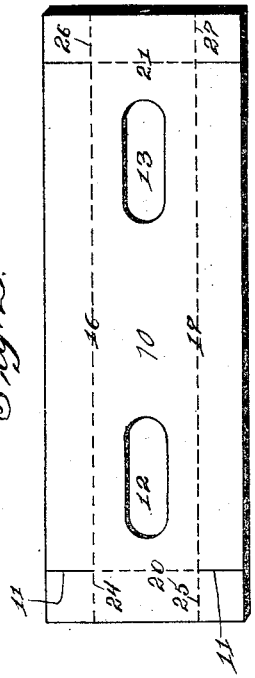
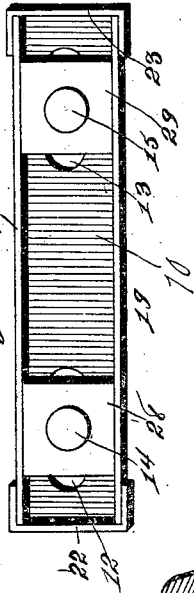
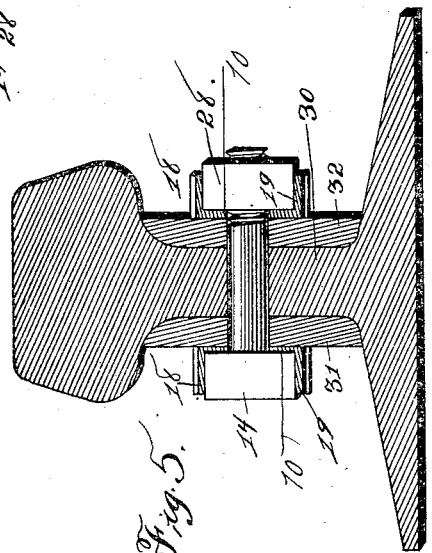
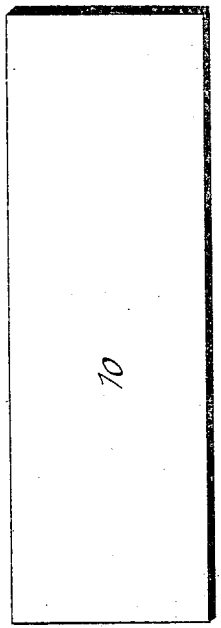

UNITED STATES PATENT OFFICE.

GEORGE W. DARLING, OF MARSHALLTOWN, IOWA.

NUT-LOCK.

No. 855,698.

Specification of Letters Patent.

Patented June 4, 1907.

Application filed July 13, 1906. Serial No. 326,504.

*To all whom it may concern:*

Be it known that I, GEORGE W. DARLING, a citizen of the United States of America, and a resident of Marshalltown, Marshall county, Iowa, have invented a new and useful Nut-Lock, of which the following is a specification.

The object of this invention is to provide improved means for preventing accidental rotation of a nut and bolt relative to each other.

A further object of this invention is to provide improved means for preventing accidental rotation of a nut and bolt relative to each other and relative to the object on which they are mounted.

A further object of this invention is to provide improved means for connecting two or more bolts and two or more nuts in such manner as to prevent accidental rotation of either of them relative to each other or relative to the object on which they are mounted.

My invention consists in the construction, arrangement and combination of elements hereinafter set forth, pointed out in my claims and illustrated by the accompanying drawing, in which—

Figure 1 is a plan of a blank from which my improved device is made. Fig. 2 is a plan of my improved device preparatory to use. Fig. 3 is a plan or elevation of my improved device shaped for use but unapplied. Fig. 4 is a plan or elevation of my device mounted for use in connecting two bolts and engaging two nuts in such manner that the nuts are non-rotatable relative to each other or to the bolts or to the object on which they may be mounted. Fig. 5 is a cross-section of a railway rail showing two of my improved devices mounted as required for practical use.

In the construction of the device as shown, the numeral 10 designates a blank of sheet metal, preferably square or rectangular in form. A cut or slit 11 is made in the blank 10 adjacent each end of said blank and at right angles to the longer side margins thereof, the slits on one side being opposite to and in alinement with the slits on the opposite side. Slots or apertures 12, 13 are formed in and longitudinally of the plate 10 and are in alinement with each other.

In practical use, square-headed bolts 14, 15 are mounted through the apertures 12, 13 of a plate, the side portions of said plate are bent outward on the dotted lines 16, 17 into planes at right angles to the body and into contact with side margins of the heads of said bolts and form flanges 18, 19, end portions of said plate are bent outward on the dotted lines 20, 21 into planes at right angles to the body to form flanges 22, 23 contacting with the ends of the flanges 18, 19, and end portions of the flanges 22, 23 are bent on the dotted lines 24, 25, 26 and 27 into contact with the outer faces of the flanges 18, 19. The flanges 18, 19 are held against spreading by the inturned end portions of the flanges 22, 23. and in turn prevent rotation of the square-headed bolts 14, 15. An identical plate 10 may be mounted on the threaded end portions of the bolts 14, 15 (whether or not said bolts have square heads); the nuts 28, 29 be seated on said bolts; and the margins of the plate bent as above described, side flanges thereof engaging sides of the nuts and end flanges thereof preventing spreading of the side flanges, thus preventing rotation of either nut. When a plate is used for the heads of the bolts and another plate for the nuts, and each plate engages two heads or two nuts, neither bolt or nut may rotate relative to the other or relative to the objects (such as a railway rail 30 and fish-plates 31, 32) with which they are used. The nuts can be tightened one-fourth a revolution or multiples thereof, or be removed, by flattening the flanges into the plane of the body of the plate, after which they can be reformed in engaging position as desired within the limits of their elasticity.

Any desired number of apertures may be formed in the plate 10 to accommodate any desired number of bolts.

The apertures 12, 13 are elongated to permit of the use of a given plate on bolts variously spaced apart.

I claim as my invention—

1. A nut lock, comprising a plate formed with elongated apertures in alinement longitudinally of said plate, said plate also formed with slits transversely of its end portions, both side margins of said plate between said slits adapted to be bent laterally at right angles to the body of the plate and both end margins of said plate outside of said slits adapted to be bent laterally at right angles to the body of the plate and at right angles to and overlapping the side margins of the plate.

2. A nut lock comprising a plate formed with elongated apertures in alinement longitudinally of said plate and also formed with slits extending inward from side margins of the plate and adjacent the ends thereof, the side margins of the plate between said slits adapted to be bent laterally at right angles to the body of the plate and into planes parallel with each other, the end portions of said plate outside the slits adapted to be bent laterally at right angles to the plate and to the side margins, and end portions of the end flanges thus formed adapted to be bent at right angles into contact with the outer faces of the bent side portions of said plate, whereby the side flanges are retained against separation.

Signed by me at Marshalltown, Iowa, this 30th day of January, 1906.

GEORGE W. DARLING.

Witnesses:
S. H. GIMRE,
T. C. WHALEY.